United States Patent Office 3,387,021
Patented June 4, 1968

3,387,021
AMINO HYDROXYETHYL CYCLOBUTANES
Robert W. White, Willingboro, N.J., and Stella W. King, Elkins Park, Pa., assignors to Rohm & Haas Company, Philadelphia, Pa., a corporation of Delaware
No Drawing. Filed Apr. 8, 1965, Ser. No. 446,691
5 Claims. (Cl. 260—574)

ABSTRACT OF THE DISCLOSURE

Pinene derivatives having the formula

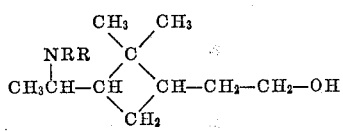

wherein R may be hydrogen, alkyl of 1 to 12 carbon atoms, phenyl, alkyl substituted phenyl, aralkyl and alkyl-substituted aralkyl. The compounds are useful in the preparation of polyester amides by reaction with dibasic acids.

---

This case deals with pinene derivatives having the formula

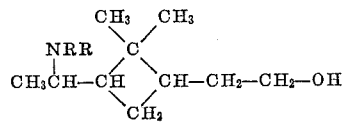

It further deals with a method for the preparation of these pinene derivatives.

In the pinene derivatives of this invention, set forth above, the R groups may represent hydrogen, alkyl of 1 to 12 carbon atoms, phenyl, alkyl-substituted phenyl, in which the alkyl substitution contains up to 8 carbon atoms, aralkyl and alkyl-substituted aralkyl, in which the alkyl substituent contains up to 8 carbon atoms. Within any one compound, the R groups may be the same or different, as desired. The alkyl substitution within the phenyl and aralkyl definition set forth may be specified by one or more alkyl groups as long as the limitation to carbon content is observed.

Typically, the R groups may represent hydrogen, methyl, ethyl, butyl, hexyl, octyl, phenyl, dimethylphenyl, diethylphenyl, benzyl, dimethylbenzyl and dibutylbenzyl. The alkyl groups within the R definition may exist in any of the known spatial configurations, such as normal, iso or tertiary, as desired.

The present products are prepared by the reductive amination of pinonic aldehyde. Pinonic aldehyde has the formula

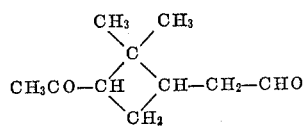

The first step of the process comprises reaction with hydrogen. This first step of the reaction of the present invention is conducted in the presence of nickel, cobalt or rhodium hydrogenation catalysts, such as the typical Raney nickel or Raney cobalt.

The reaction is conducted in the temperature range of about 20° to 80° C., preferably 30° to 60° C. Pressures of about 50 to 500 p.s.i.g., preferably 50 to 200 p.s.i.g., are employed. The reaction proceeds on a substantially mole for mole basis. The course of the reaction can be followed by observing the absorption of hydrogen and resultant drop in pressure. When one mole of hydrogen per mole of aldehyde has been absorbed, the reaction is substantially complete.

After substantially one molar equivalent of hydrogen has reacted with the pinonic aldehyde, there is then introduced ammonia or an amine having the formula RRNH

wherein the R groups have been previously defined. The amination step is conducted in the presence of hydrogen at a temperature of about 50° to 250° C., preferably 60° to 100° C. Pressures in the range of 300 to 3000 p.s.i.g., preferably 500 to 1000 p.s.i.g. are employed. The amination is conducted in the presence of a hydrogenation catalyst, as defined previously.

At the conclusion of the reaction, the catalyst is removed by conventional techniques and the product isolated in the usual manner, such as by distillation or the like.

Typical reactants that may be employed in the amination step include ammonia, methylamine, dimethylamine, ethylamine, diethylamine, butylamine, octylamine, dioctylamine, phenylamine, dibutylphenylamine, phenylmethylamine, phenylethylamine, diphenylamine, benzylamine, dibenzylamine, octylbenzylamine, octylbenzylethylamine and dibutylbenzylamine.

The products of this invention are useful in the preparation of polyester amides by reaction with dibasic acids, such as sebacic, phthalic and the like. The polyester amides thus formed are useful as films and fibers, particularly for textile products.

This invention may be more fully understood from the following illustrative examples.

Example 1

A solution of 168 g. of pinonic aldehyde in 150 ml. of methanol was charged to a one-liter stirred autoclave with 15 g. of Raney nickel. The autoclave was flushed with hydrogen and pressurized to 500 p.s.i.g. with hydrogen. The autoclave was stirred at 40° C. until one mole of hydrogen was absorbed. The hydrogenation was halted, while 50 g. of ammonia was added, and was resumed at 800 p.s.i.g. at 100° C. When absorption of one mole of hydrogen was complete, the autoclave was cooled and vented. The contents of the autoclave were filtered and distilled to give 145 g. of 1-(1-aminoethyl)-3-(2-hydroxyethyl)-2,2-dimethylcyclobutane, B.P. 90° to 92° C. (0.1 mm. absolute pressure), $n_D^{25}$ 1.4767, neutral equivalent 170 (calculated 171).

Example 2

The experiment outlined in Example 1 was repeated using 60 g. of methylamine in place of the ammonia. Distillation of the product gave 139 g. of 1-(1-methylaminoethyl) - 3 - (2 - hydroxyethyl)-2,2-dimethylcyclobutane.

Example 3

Substitution of 95 g. of dimethylamine for the ammonia in Example 2 and repetition of the experiment outlined in Example 1 led to isolation of 145 g. of 1-(1-dimethylaminoethyl) - 3 - (2 - hydroxyethyl)-2,2-dimethylcyclobutane.

Example 4

Replacement of the ammonia used in Example 1 with 100 g. of ethylamine while repeating the experimental details of Example 1 gave on workup and distillation 152 g. of 1-(1-ethylaminoethyl)-3-(2-hydroxyethyl)-2,2-dimethylcyclobutane.

Example 5

The experimental procedure given in Example 1 was repeated using 150 g. of t-butylamine in place of the ammonia. After the reduction was complete, the solution was filtered and distilled to give 158 g. of 1-(1-t-butylaminoethyl) - 3 - (2 - hydroxyethyl) - 2,2-dimethylcyclobutane.

Example 6

The phenylamino homolog of the product described in Example 1 was prepared by reducing pinonic aldehyde, as described in Example 1, until one equivalent of hydrogen was absorbed. The reduction was completed after addition of 150 g. of aniline. The usual workup gave 150 g. of the phenylaminoalcohol of this invention.

Example 7

Using the procedure outlined in Examples 1 and 6, with the substitution of 200 g. of β-phenylethylamine for ammonia, gave 170 g. of 1-(1-β-phenylethylamino)-3-(2-hydroxyethyl)-2,2-dimethylcyclobutane.

We claim:
1. A composition of matter having the formula

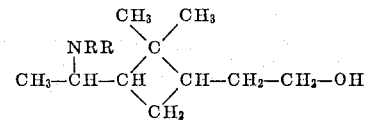

in which R is selected from the class consisting of hydrogen, alkyl of 1 to 12 carbon atoms, phenyl, alkyl-substituted phenyl, in which the alkyl contains up to 8 carbon atoms, and aralkyl and alkyl-substituted aralkyl, in which the alkyl substituent contains up to 8 carbon atoms.

2. 1 - (1 - aminoethyl) - 3 - (2-hydroxyethyl)-2,2-dimethylcyclobutane.

3. 1 - (1-dimethylaminoethyl)-3-(2-hydroxyethyl)-2,2-dimethylcyclobutane.

4. 1 - (1 - ethylaminoethyl) - 3-(2-hydroxyethyl)-2,2-dimethylcyclobutane.

5. 1 - (1 - phenylaminoethyl)-3-(2-hydroxyethyl)-2,2-dimethylcyclobutane.

References Cited

Adams et al., Organic Reactions, 1948, vol. IV, 196–199.

CHARLES S. PARKER, *Primary Examiner.*

P. C. IVES, *Assistant Examiner.*